United States Patent
Grant et al.

(10) Patent No.: US 10,331,239 B2
(45) Date of Patent: Jun. 25, 2019

(54) PERIPHERAL USER-INTERFACE DEVICE

(71) Applicant: Microsoft Technology Licensing, LLC, Redmond, WA (US)

(72) Inventors: Joshua Chapman Grant, Redmond, WA (US); Geo John Palakunnel, Bellevue, WA (US); Filipp Demenschonok, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 12 days.

(21) Appl. No.: 15/645,170

(22) Filed: Jul. 10, 2017

(65) Prior Publication Data
US 2019/0012003 A1    Jan. 10, 2019

(51) Int. Cl.
*G06F 3/03* (2006.01)
*G06F 3/041* (2006.01)
*G06F 3/0346* (2013.01)
*G06F 3/0354* (2013.01)
*G06F 3/0362* (2013.01)

(52) U.S. Cl.
CPC .......... *G06F 3/0362* (2013.01); *G06F 3/0312* (2013.01); *G06F 3/0346* (2013.01); *G06F 3/03547* (2013.01); *G06F 3/041* (2013.01)

(58) Field of Classification Search
CPC ....... G06F 3/041; G06F 3/0312; G06F 3/0362
See application file for complete search history.

(56) References Cited

U.S. PATENT DOCUMENTS

| | | | |
|---|---|---|---|
| 6,567,079 B1* | 5/2003 | Smailagic | G06F 1/163 345/156 |
| 7,084,856 B2* | 8/2006 | Huppi | G06F 3/03543 345/156 |
| 8,190,993 B2 | 5/2012 | Kondo et al. | |
| 8,766,910 B2 | 7/2014 | Grivna | |
| 8,964,364 B2 | 2/2015 | Abdelsamie et al. | |
| 9,280,214 B2 | 3/2016 | Mercea et al. | |
| 2003/0076301 A1* | 4/2003 | Tsuk | G06F 1/1626 345/159 |
| 2007/0242060 A1 | 10/2007 | Cheah | |
| 2008/0059913 A1 | 3/2008 | Burtner et al. | |
| 2008/0238879 A1 | 10/2008 | Jaeger et al. | |
| 2010/0126784 A1 | 5/2010 | Suddreth | |
| 2013/0220779 A1 | 8/2013 | Kerner et al. | |
| 2014/0260776 A1 | 9/2014 | Burleson | |
| 2015/0355731 A1 | 12/2015 | Tanaka | |

(Continued)

OTHER PUBLICATIONS

Cangeloso, Sal, "Logitech NuLOOQ Navigator", https://www.geek.com/gadgets/logitech-nulooq-navigator-571565/, Published on: Feb. 4, 2007, 14 pages.

(Continued)

*Primary Examiner* — Muhammad N Edun
(74) *Attorney, Agent, or Firm* — Alleman Hall Creasman & Tuttle LLP

(57) ABSTRACT

A peripheral user-interface device for navigation of display content on an electronic display of a computer system. It comprises a base movable relative to the electronic display, a rotary dial arranged on the base and rotatable relative to the base, and an electronic touch sensor coupled mechanically to the base.

16 Claims, 7 Drawing Sheets

(56) References Cited

U.S. PATENT DOCUMENTS

2016/0253050 A1* 9/2016 Mishra ............... G06F 3/0482
715/727

OTHER PUBLICATIONS

Park, et al., "O6—Free your Eyes", https://www.kickstarter.com/projects/55699542/o6-free-your-eyes, Published on: Jun. 16, 2016, 19 pages.

"PowerMate Bluetooth", https://griffintechnology.com/us/powermate-bluetooth, Retrieved on: Jan. 16, 2016, 3 pages.

"International Search Report and Written Opinion Issued in PCT Application No. PCT/US18/034528", dated Aug. 8, 2018, 10 Pages.

* cited by examiner

PERIPHERAL USER-INTERFACE DEVICE

BACKGROUND

Most computer systems include one or more peripheral user-interface (UI) devices, which present output and/or facilitate user input. A computer mouse is an appropriate peripheral UI device for navigation of display content on an electronic display of a computer system. However, the computer mouse offers only a limited range of input functionality.

SUMMARY

Disclosed herein is a peripheral user-interface (UI) device for navigation of display content on an electronic display of a computer system. The peripheral UI device comprises a base movable relative to the electronic display, a rotary dial arranged on the base and rotatable relative to the base, and an electronic touch sensor coupled mechanically to the base.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
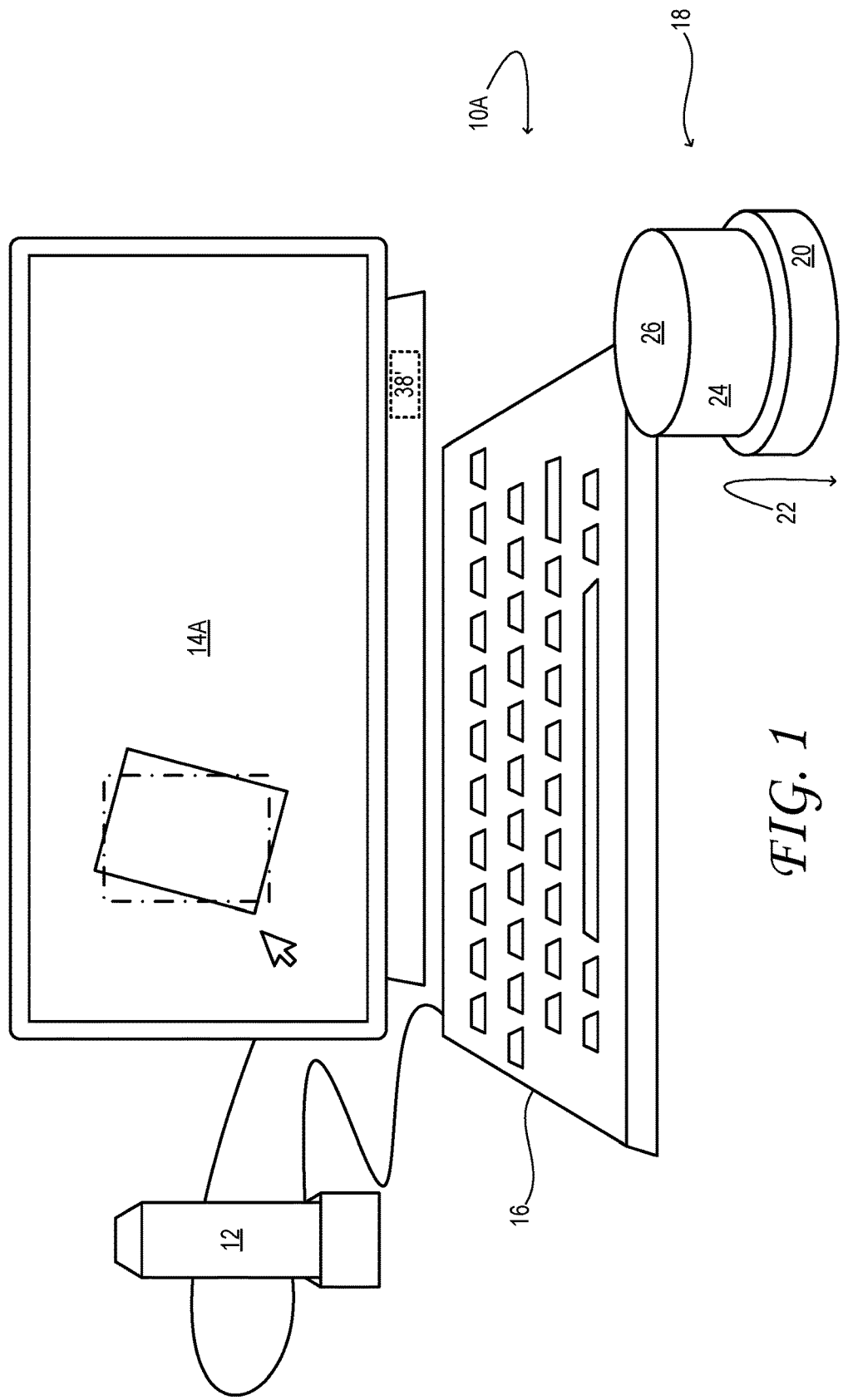
FIGS. 1, 2, and 3 show aspects of example computer systems, each having a peripheral UI device.

This disclosure is presented by way of example and with reference to the drawing figures listed above. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

FIG. 1 shows aspects of an example computer system 10A. The computer system includes a desktop console 12 operatively coupled to electronic display 14A and to keyboard 16. Computer system 10A may take the form of a desktop computer system or video-game system, for example. Desktop console 12 of FIG. 1 is operatively coupled also to peripheral user-interface (UI) device 18, which can be used to control various aspects of computer system 10A, including facilitating navigation of display content presented on electronic display 14A. Such display content may include a graphical user interface, an electronic photo album, a video-gaming environment, etc.

Peripheral UI device 18 includes a base 20 movable by hand relative to electronic display 14A. In this example, the base is configured to slide or roll across its supporting surface 22 without damaging the surface. The supporting surface may be a table, desk, etc. This feature enables the user to position the peripheral UI device for optimal comfort when viewing electronic display 14A and/or typing on keyboard 16. In some embodiments, the underside of the base includes a mousing sensor—e.g., a mechanical track ball or optical sensor that registers 2D motion of the base relative to the supporting surface. Thus, in some implementations, the peripheral UI device may provide the UI functionality of a conventional computer mouse.

In addition, peripheral UI device 18 includes a rotary dial 24 arranged on base 20. The rotary dial is rotatable by hand relative to the base and is coupled mechanically to a rotation sensor fixed to the base (vide infra). Accordingly, peripheral UI device 18 may provide UI functionality beyond that of a conventional computer mouse. The user of the peripheral UI device may rotate the rotary dial clockwise or counterclockwise to adjust a parameter value (e.g., an audio volume or left/right balance), select one of plural menu items, and/or effect rotation of a selected graphic, user-interface element, or game character, for example.

To provide still greater UI functionality, peripheral UI device 18 includes an electronic touch sensor 26 coupled mechanically to base 20. The electronic touch sensor may be a resistive, capacitive, or optical touch sensor, for example. The type of UI functionality afforded by the electronic touch sensor is not limited and may include pointing, selecting, and/or rotating a graphic or UI element presented on electronic display 14A. In some embodiments, the electronic touch sensor may be a multitouch sensor capable of distinguishing a two-finger pinch gesture, for instance, which may facilitate zoom-in and zoom-out functions. Accordingly, peripheral UI device 18 may be configured to provide multivariate UI navigation and control.

Figure 2:
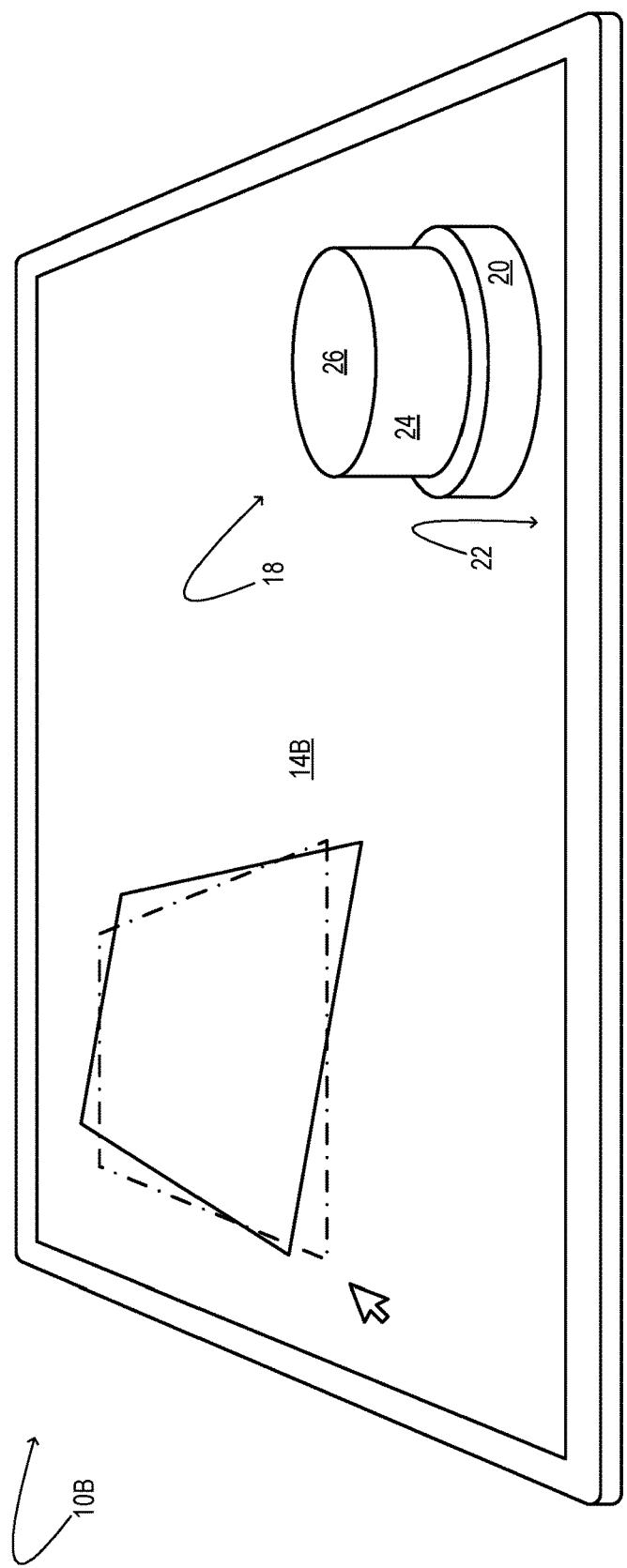

FIG. 2 shows aspects of another example computer system 10B. Computer system 10B may take the form of a large-format tablet or all-in-one computer system, for example. Electronic display 14B of computer system 10B includes a viewing surface 22' which is also a touch-screen surface. In this embodiment, base 20 of peripheral UI device 18 is movable by hand from one to another position on the viewing surface. This feature enables the user to position the peripheral UI device so as to avoid blocking display content of current interest and/or to move the peripheral UI device to interact with a particular portion of the touch-screen surface. As in the previous embodiment, the base of the peripheral UI device is configured to slide or roll across the viewing surface without damaging the viewing surface.

Figure 3:
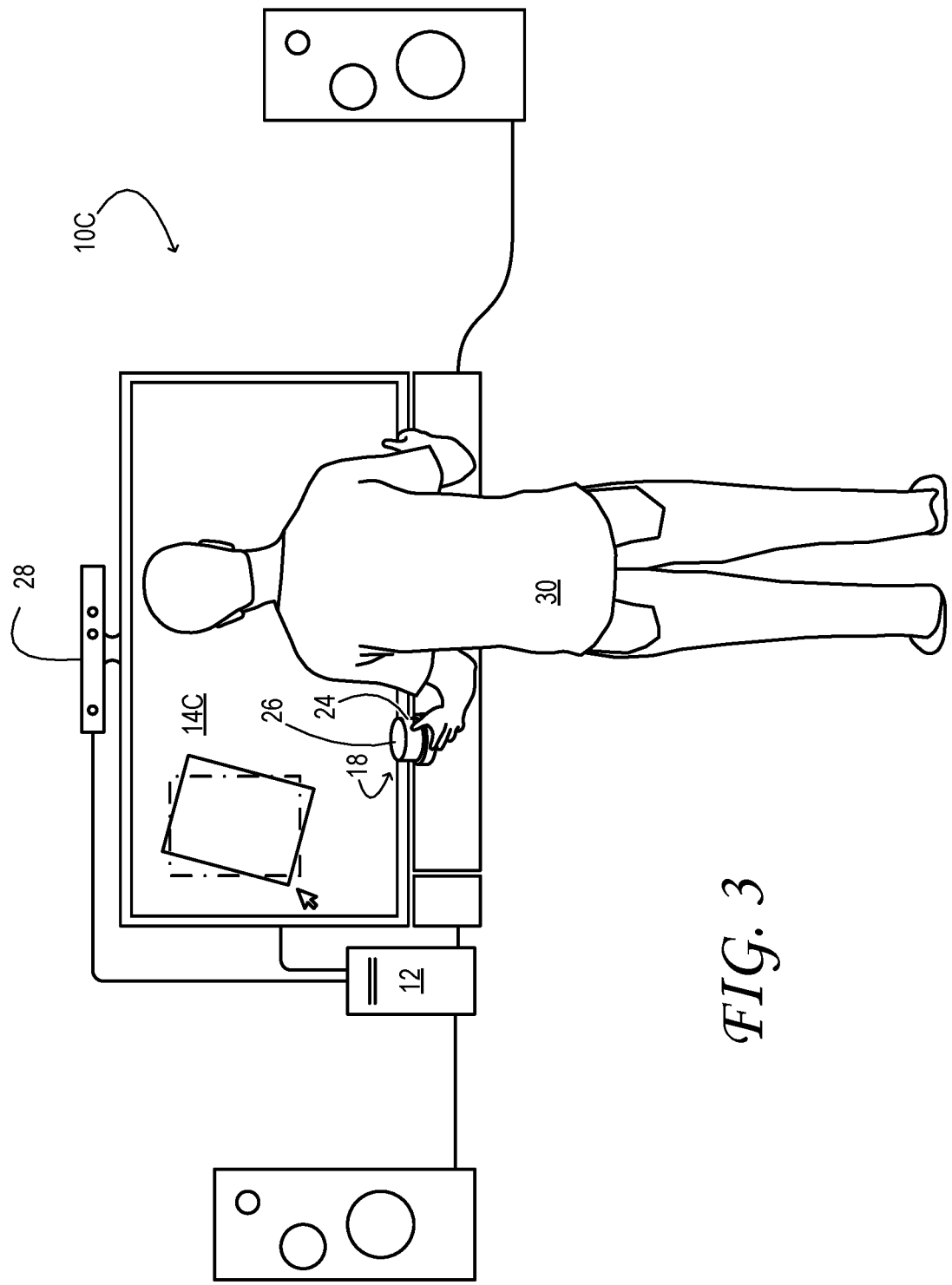

FIG. 3 shows aspects of another example computer system 10C in the form of a home-theatre or home-entertainment system. Some of the user-input to computer system 10C is provided via depth-imaging camera 28, which may be operatively coupled to downstream object-recognition logic of console 12, to track the user's hand or body gestures, etc. With the configuration illustrated in FIG. 3, user 30 may, in some scenarios, hold peripheral UI device 18 in one hand and actuate rotary dial 24 and electronic touch sensor 26 with the other hand.

Figure 4:
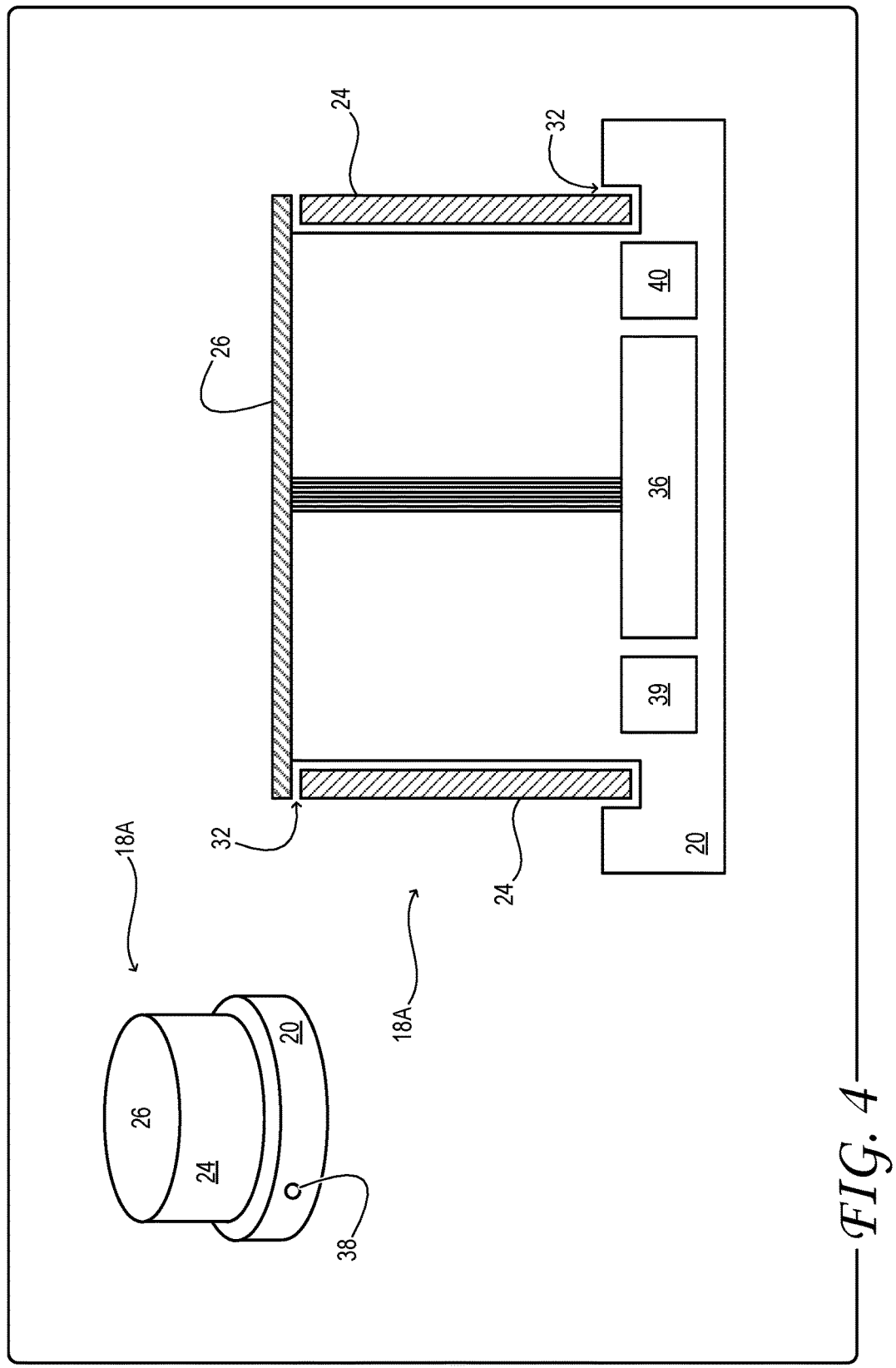
FIGS. 4 and 5 show aspects of example peripheral UI devices.

FIG. 4 shows aspects of a peripheral UI device 18A in one non-limiting embodiment. In peripheral UI device 18A, rotary dial 24 is adjusted by rotating the cylindrical, circumferential surface 22 of the rotary dial, which is separated from base 20 and from touchscreen 26 via bearing interface 32. The structure of the bearing interface is not particularly limited: it may include one or more mechanical bearings and/or a loose-fitting slot or guide. Electronic touch sensor 26 is coupled fixedly to base 20 and is not rotatable relative to the base, such that the rotary dial rotates while the electronic touch sensor remains stationary.

Figure 5:
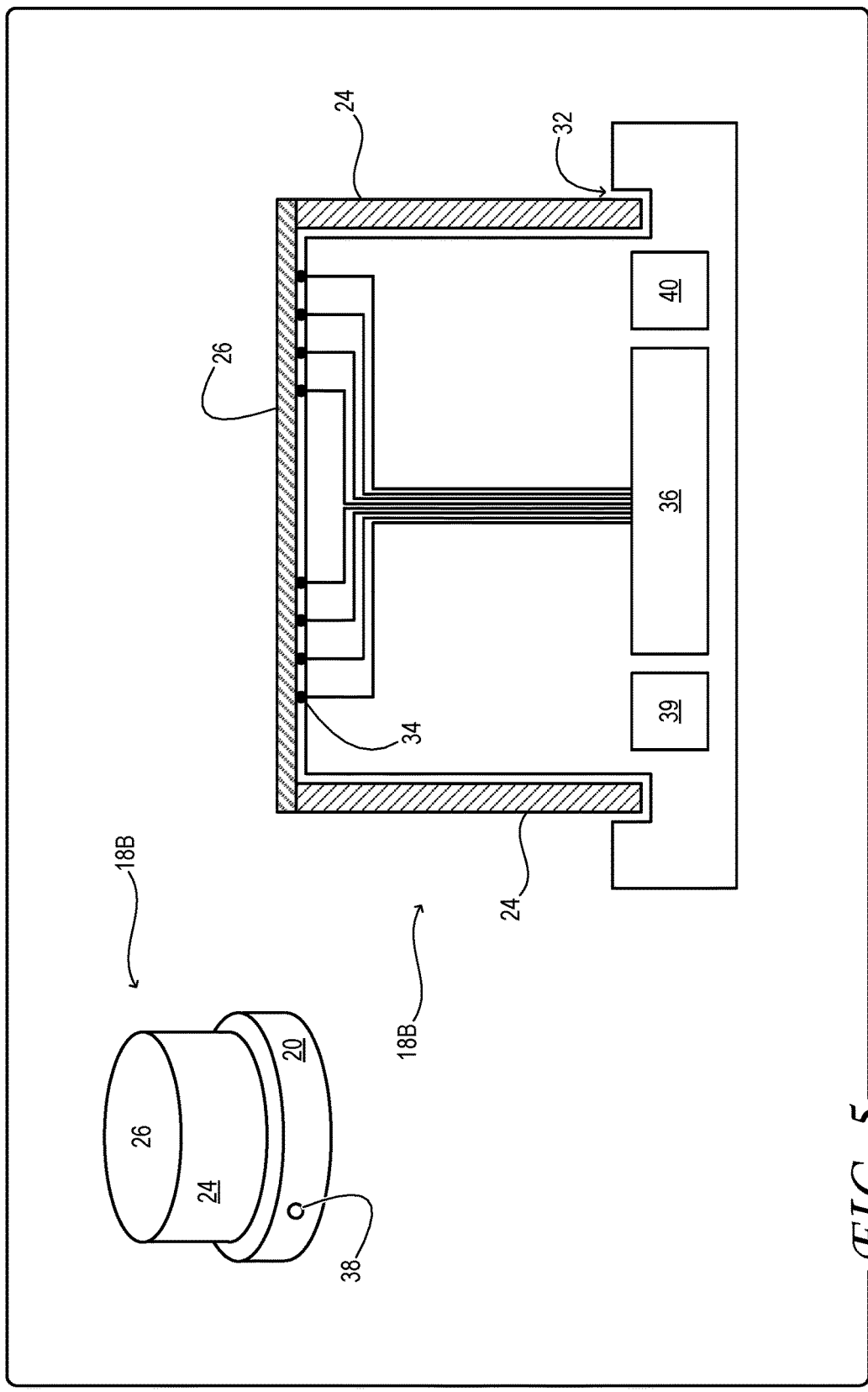

FIG. 5 shows aspects of a peripheral UI device 18B in another non-limiting embodiment. In peripheral UI device 18B, rotary dial 24 may be adjusted by rotation of cylindrical, circumferential surface 22 and/or electronic touch sensor 26, which are monolithic or coupled together. Thus, the electronic touch sensor of FIG. 5 is coupled rotatably to base 20 and coupled fixedly to rotary dial 24, such that the electronic touch sensor rotates with the rotary dial. In this configuration, brushes 34 provide moving points of electrical contact between the rotating electronic touch sensor and logic 36, which is arranged in the base.

Peripheral UI devices 18A and 18B also include an output interface 39. The output interface is configured to assert data representing the various output states of the peripheral UI device. Such states may include X, Y coordinates corresponding to the relative position of the device on a surface (i.e., mousing coordinates) in addition to a coordinate R corresponding to the extent of rotation of the rotary dial. In addition, the output states of the peripheral UI device may include, for one or more sensed touchpoints on electronic touch sensor 26, the X, Y coordinate corresponding to that touchpoint and/or a heatmap thereof. Output interface 39 may be a wired (e.g., USB) interface in some examples. In other examples, the output interface may be wireless: it may employ WiFi, Bluetooth, or IR technology. Data asserted via the output interface is output to a compatible input interface of console 14 or other suitable input facility of the host computer system.

The computer-system and peripheral UI device configurations disclosed herein admit of multiple usage scenarios. In some scenarios, the appropriate frame of reference for electronic touch sensor 26 is the frame of reference of the user. In other words, with peripheral UI device 18 positioned in front of the user and oriented in a standard way with respect to the user, rightward movement of the user's touchpoint on the touch sensor may result in corresponding rightward movement of the cursor or other UI element on electronic display 14. In other scenarios, however, the appropriate frame of reference for the electronic touch sensor is the frame of reference of electronic display 14. In that scenario, movement of the touchpoint toward the electronic display may result in upward movement of the cursor on the electronic display, while movement of the touchpoint parallel to the electronic display may result in side-to-side movement of the cursor. This frame of reference would be useful, for example, in the event that two or more users must navigate display content on the electronic display using a peripheral UI device held or positioned between them.

In embodiments as shown in FIG. 2, where the peripheral UI device is positioned on viewable surface 22' of touch-screen computer system 10B, the touch screen may be configured to sense the peripheral UI device and assess its orientation. To this end, the underside of base 20 of the peripheral UI may include a distinctive marker configured to be sensed by the electronic display. The marker may be an optical marker for an optical touch screen, or a capacitive or resistive marker for touch screens based on capacitive or resistive technologies. In still other embodiments, a user-visible marker such as an arrow, dot, or detent may be arranged on the visible portion of the base, to enable the user to manually align the peripheral UI device to the electronic display.

In other embodiments, one or more dedicated orientation sensors may be used to assess the relative orientation of electronic display 14 and peripheral UI device 18. To this end, logic 36 may be configured to mathematically transform the coordinates of user touch based on the orientation of the electronic touch sensor relative to the electronic display. In some examples, the mode of transformation of the output may include multiplication of the vectorized coordinates by one or more coordinate transforms—e.g., translational, rotational, and/or scaling transforms. The coordinate-transform operation may be explicit or implicit; in some examples, a look-up table may be used.

In some examples, logic 36 is an internal component of peripheral UI device 18. Accordingly, the data asserted by output interface 39 may be appropriately mapped to the frame of reference of electronic display 14. This configuration enables the host computer system to be relatively agnostic to the operating details of the peripheral UI device and leverages the internal microcontroller architecture of the peripheral UI device. In other examples, however, the logic may be arranged elsewhere—e.g., in console 14 of computer system 10A. In these configurations, the data asserted by output interface 39 corresponds to the local frame of reference of the peripheral UI device. Transforming the data outside of peripheral UI device 18 relieves the peripheral UI device of the task of performing transform operations, thereby increasing battery life, and is amenable to implementations in which orientation sensing is enacted cooperatively by the host computer and peripheral UI device.

Peripheral UI device 18 may include one or more orientation sensors—e.g., peripheral orientation sensor 38. Accordingly, logic 36 optionally may be configured to transform the coordinates of user touch based on output of the orientation sensor so that the output coordinates of the touch sensor map to the frame of reference of electronic display 14. In some implementations, data from the orientation sensor(s) may be output to the host computer so that the host may map the received touch input to the frame of reference of the electronic display.

Figure 6:
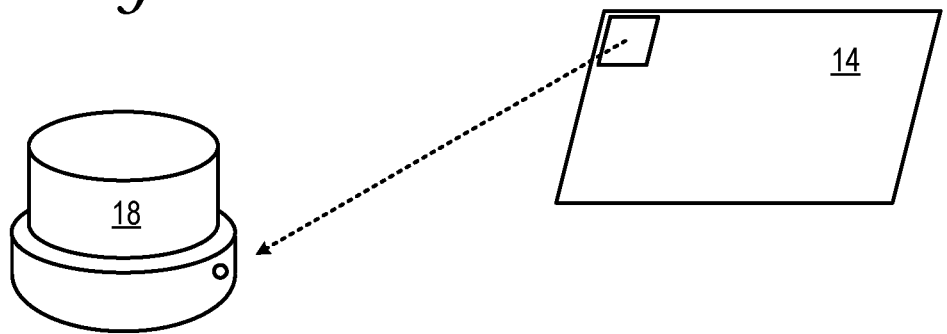
FIGS. 6, 7, 8, and 9 show aspects of example computer systems, each having a peripheral UI device.

In some embodiments, the orientation sensor may be a display-sensing orientation sensor. In general, a display-sensing orientation sensor may be configured to sense optical or acoustic radiation from electronic display 14, and, based on the properties of the radiation sensed, determine the orientation of the electronic touch sensor relative to the electronic display. In some embodiments, as shown in FIG. 6, the radiation received and sensed from the electronic display takes the form of display light emitted by the electronic display during a predetermined calibration timeslice. The calibration timeslice may be scheduled to occur periodically, during a brief interval between display frames, for example. Logic 36 of peripheral UI device 18 may be synchronized with the logic driving the electronic display, so as to sense the light emitted during the calibration timeslice. In some examples, the light emitted during the calibration timeslice may include a spatial pattern that enables the logic to assess the orientation of the electronic touch sensor relative to the electronic display. In the embodiment of FIG. 2, where the bottom of base 20 of the peripheral UI device is in contact with viewable surface 22', the orientation sensor may be arranged at the bottom of the base. In other embodiments, the orientation sensor may be arranged along a side surface of the base, to sight the electronic display.

Figure 7:
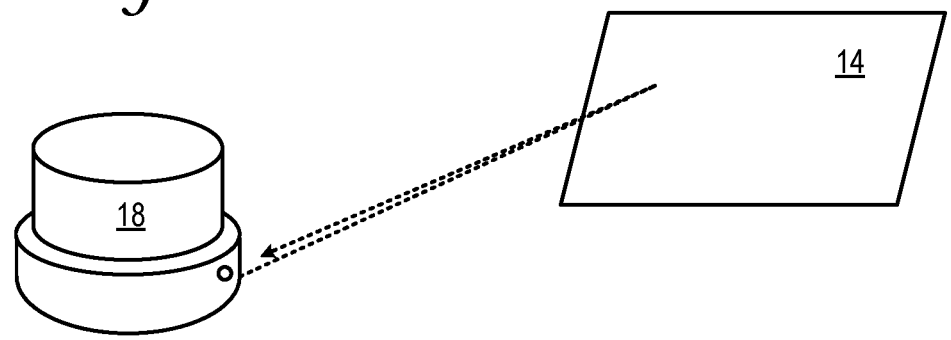
Figure 8:
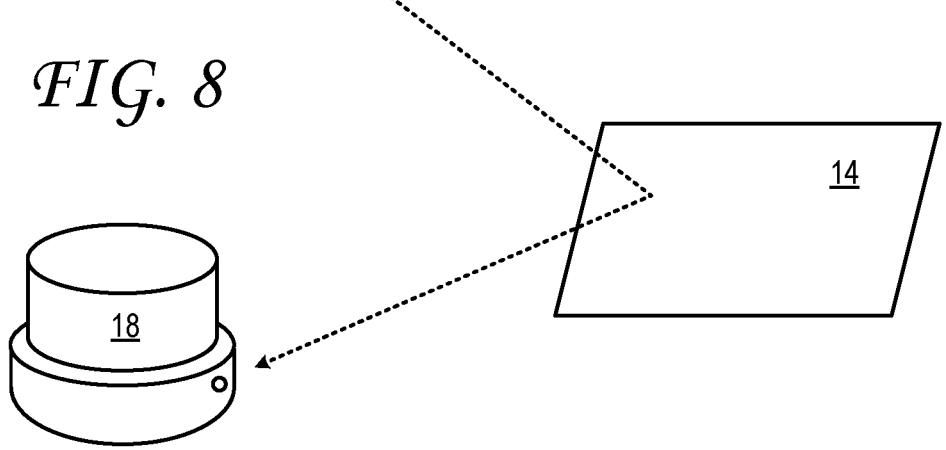

In some embodiments, the radiation received and sensed from electronic display 14 is a reflected radiation originating from peripheral UI device 18 (FIG. 7) or from the environment (FIG. 8). The peripheral UI device may be configured, for example, to emit an infrared or ultrasonic pulse, which is reflected from the electronic display. In other examples, the reflected radiation may comprise room light. In a more particular embodiment, the display-sensing orientation sensor may be an imaging sensor with output provided to object-recognition module 40 arranged within the peripheral UI device (as shown in FIGS. 4 and 5) or within computer system 10. The object-recognition module may be configured to identify the electronic display within the field of view of the imaging sensor, and thereby determine the orientation of electronic touch sensor 26 relative to the electronic display. In other examples, the display-sensing orientation sensor may be an optical or acoustic time-of-flight sensor that assesses, relative to a local frame of reference of the peripheral UI device, the angle of the vector leading to the promptest echo from the electronic display.

In some embodiments, peripheral UI device 18 may include a peripheral orientation sensor 38 which is responsive to and configured to sense an absolute orientation of electronic touch sensor 26. The absolute orientation may be a 'geographic orientation', which a compass and inclinometer combination may provide. In these embodiments, electronic display 14 may comprise (as shown in FIG. 1) a host orientation sensor 38' responsive to the absolute orientation of the electronic display. Here, logic 36 (or analogous logic of the host computer) may be configured to transform the coordinates of user touch based on comparative output of the host and peripheral orientation sensors, which defines the relative orientation. To this end, the electronic display and the peripheral UI device may be serviced by a common application programming interface (API) residing in an operating system of computer system 10. In some examples, each of the host and peripheral orientation sensors may include an electronic compass. In other examples, one electronic compass arranged in the peripheral UI device may be sufficient, as the absolute orientation of the electronic display may be assumed to be fixed after installation of the electronic display, as would be expected in the embodiment shown in FIG. 3.

No aspect of the foregoing drawings or description should be interpreted in a limiting sense, for numerous variations, extensions, and omissions are contemplated as well. In one variant, at least some functionality of orientation sensor 38 may be enacted in electronic touch sensor 26 or another touch sensor arranged in rotary dial 24. The touch sensor may sense the user's hand and/or fingering on or near the rotary dial and apply a heuristic to determine the most probable orientation of touch screen 26 relative to electronic display 14 based on the hand and/or fingering. One suitable heuristic would rely on the fact that the user may face the electronic display in ordinary use, with the high-capacitance palm of the hand situated on the opposite side of the peripheral UI device than the side closest to (i.e., oriented toward) the electronic display.

As noted above, the methods and processes described herein may be tied to a computer system of one or more computing devices. In particular, such methods and processes may be implemented as a computer system-application program or service, an application-programming interface (API), a library, and/or other computer system-program product.

Figure 9:
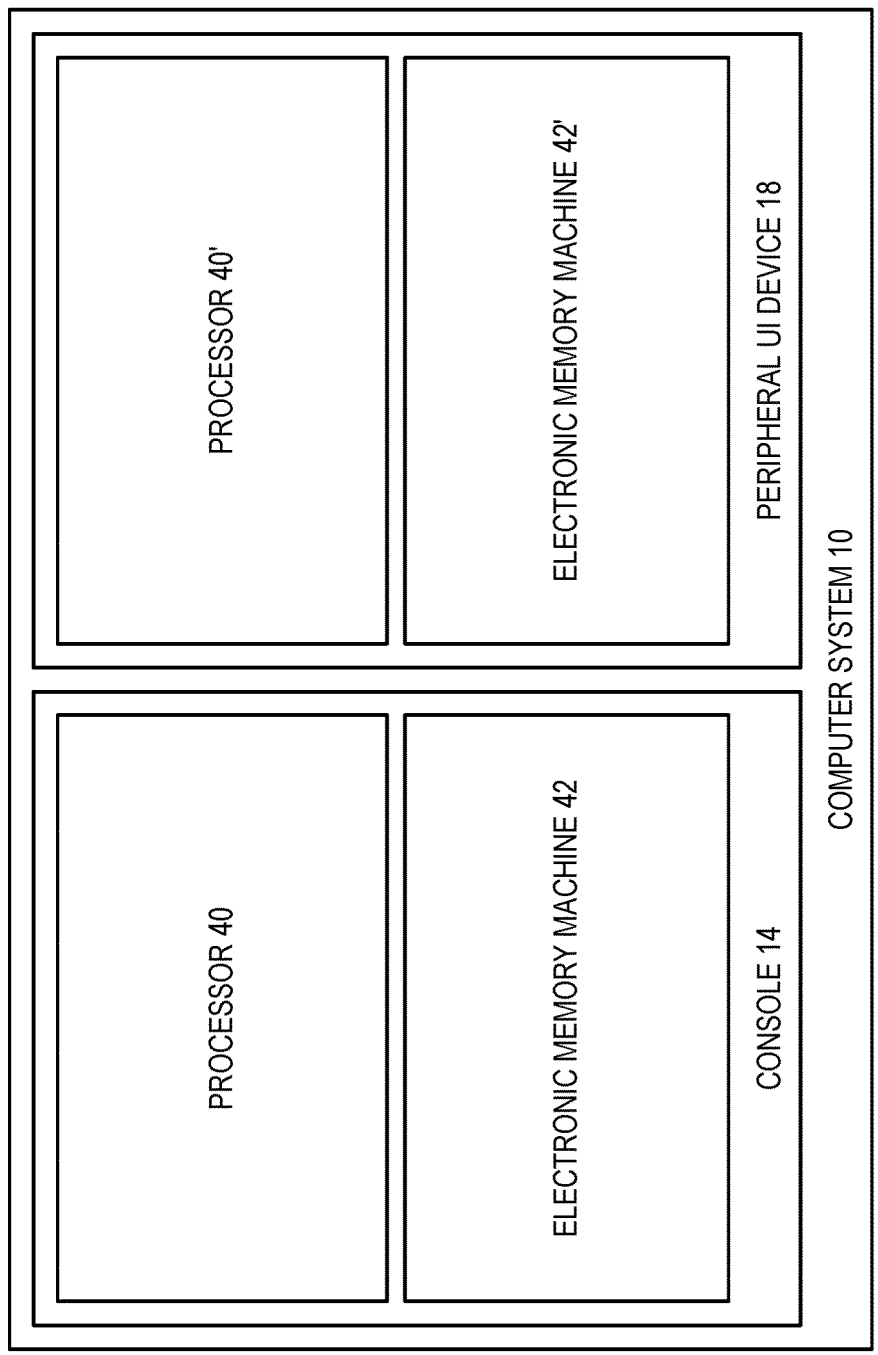

Referring now to FIG. 9, computer system 10 may be configured to enact the methods and processes described above. Computer system 10 includes at least processor 40 and at least one electronic memory machine 42, for example. Computer system 10 includes a display subsystem, input subsystem, communication subsystem, other components not shown in FIG. 9.

Each processor 40 includes one or more physical devices configured to execute instructions. For example, the processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Each processor 40 may be one of a plurality of processors configured to execute software instructions. Additionally or alternatively, the processor may include one or more hardware or firmware logic machines configured to execute hardware or firmware instructions. Processors of computer system 10 may be single-core or multi-core, and the instructions executed thereon may be configured for sequential, parallel, and/or distributed processing. Individual components of the computer system optionally may be distributed among two or more separate devices, which may be remotely located and/or configured for coordinated processing. Aspects of the computer system may be virtualized and executed by remotely accessible, networked computing devices configured in a cloud-computing configuration.

Each electronic memory machine 42 includes one or more physical devices configured to hold instructions executable by processors 40 to implement the methods and processes described herein. When such methods and processes are implemented, the state of electronic memory machine 42 may be transformed—e.g., to hold different data.

Each electronic memory machine 42 may include removable and/or built-in devices. Each electronic memory machine 42 may include semiconductor memory (e.g., RAM, EPROM, EEPROM, etc.), and/or magnetic memory (e.g., hard-disk drive, floppy-disk drive, tape drive, MRAM, etc.), among others. Each electronic memory machine 42 may include volatile, nonvolatile, dynamic, static, read/write, read-only, random-access, sequential-access, location-addressable, file-addressable, and/or content-addressable devices.

It will be appreciated that each electronic memory machine 42 includes one or more physical devices. However, aspects of the instructions described herein alternatively may be propagated by a communication medium (e.g., an electromagnetic signal, an optical signal, etc.) that is not held by a physical device for a finite duration.

Aspects of processors 40 and electronic memory machines 42 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms 'module,' 'program,' and 'engine' may be used to describe an aspect of computer system 10 implemented to perform a particular function. In some cases, a module, program, or engine may be instantiated via processors 40 executing instructions held by electronic memory machines 42. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms 'module,' 'program,' and 'engine' may encompass individual or groups of executable files, data files, libraries, drivers, scripts, database records, etc.

It will be appreciated that a 'service', as used herein, is an application program executable across multiple user sessions. A service may be available to one or more system components, programs, and/or other services. In some implementations, a service may run on one or more server-computing devices.

A display subsystem may be used to present a visual representation of data held by electronic memory machines 42. This visual representation may take the form of a graphical user interface (GUI). As the herein described methods and processes change the data held by the storage machine, and thus transform the state of the storage machine, the state of the display subsystem may likewise be transformed to visually represent changes in the underlying data. The display subsystem may include one or more near-eye display devices utilizing virtually any type of technology. Such near-eye display devices may be combined with processors 40 and/or electronic memory machines 42 in a shared enclosure, or such near-eye display devices may be peripheral near-eye display devices.

An input subsystem may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion sensing and/or intent recognition.

A communication subsystem may be configured to communicatively couple computer system 10 with one or more other computing devices. The communication subsystem may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computer system 10 to send and/or receive messages to and/or from other devices via a network such as the Internet.

One aspect of this disclosure is directed to a peripheral user-interface device for a computer system. The peripheral user-interface device comprises: a base movable relative to an electronic display of the computer system; a rotary dial arranged on the base and rotatable relative to the base; an electronic touch sensor coupled mechanically to the base; and an output interface configured to output, to the computer system, data representing an extent of rotation of the rotary dial and coordinates of user touch on the electronic touch sensor.

In some implementations, the electronic touch sensor is coupled fixedly to the base, such that the rotary dial rotates while the electronic touch sensor remains stationary. In some implementations, the electronic touch sensor is coupled rotatably to the base and coupled fixedly to the rotary dial, such that the electronic touch sensor rotates with the rotary dial. In some implementations, the base includes a marker configured to be sensed by the electronic display. In some implementations, the peripheral user-interface device further comprises an orientation sensor. In some implementations, the orientation sensor is a display-sensing orientation sensor configured to sense optical or acoustic radiation from the electronic display. In some implementations, the orientation sensor is a peripheral orientation sensor configured to sense an absolute orientation of the electronic touch sensor. In some implementations, the peripheral user-interface device further comprises logic configured to transform the coordinates of user touch based on an orientation of the electronic touch sensor relative to the electronic display. In some implementations, the logic is configured to transform the coordinates of user touch based on output of an orientation sensor. In some implementations, the logic is configured to transform the coordinates of user touch based on comparative output of host and peripheral orientation sensors.

Another aspect of this disclosure is also directed to a peripheral user-interface device for a computer system, the peripheral user-interface device comprising: a base movable relative to an electronic display; a rotary dial arranged on the base and rotatable relative to the base; an electronic touch sensor coupled mechanically to the base; a display-sensing orientation sensor; and an output interface configured to output, to the computer system, data representing an extent of rotation of the rotary dial and coordinates of user touch on the electronic touch sensor.

In some implementations, the display-sensing orientation sensor is configured to sense optical or acoustic radiation from the electronic display. In some implementations, the optical or acoustic radiation received from the electronic display is emitted by the electronic display during a calibration timeslice. In some implementations, the optical or acoustic radiation sensed from the electronic display is a reflected optical or acoustic radiation originating from the peripheral user-interface device. In some implementations, the display-sensing orientation sensor includes an imaging sensor cooperating with an object-recognition module. In some implementations, the display-sensing orientation sensor is a time-of-flight sensor.

Yet another aspect of this disclosure is directed to a peripheral user-interface device for a computer system, the computer system including an electronic display having a host orientation sensor. This peripheral user-interface device comprises: a base movable relative to the electronic display; a rotary dial arranged on the base and rotatable relative to the base; an electronic touch sensor coupled mechanically to the base; a peripheral orientation sensor; and an output interface configured to output, to the computer system, data representing an extent of rotation of the rotary dial and coordinates of user touch on the electronic touch sensor.

In some implementations, the peripheral orientation sensor is configured to sense an absolute orientation of the electronic touch sensor. In some implementations, the peripheral orientation sensor includes an electronic compass and an inclinometer. In some implementations, the peripheral user-interface device further comprises logic configured to transform the coordinates of user touch based on comparative output of host and peripheral orientation sensors.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A peripheral user-interface device for a computer system, the peripheral user-interface device comprising:
   a base movable relative to an electronic display of the computer system;
   a rotary dial arranged on the base and rotatable relative to the base;
   an electronic touch sensor coupled mechanically to the base;
   a peripheral orientation sensor configured to sense an absolute orientation of the electronic touch sensor; and
   an output interface configured to output, to the computer system, data representing an extent of rotation of the rotary dial and coordinates of user touch on the electronic touch sensor.

2. The peripheral user-interface device of claim 1 wherein the electronic touch sensor is coupled fixedly to the base, such that the rotary dial rotates while the electronic touch sensor remains stationary.

3. The peripheral user-interface device of claim 1 wherein the electronic touch sensor is coupled rotatably to the base and coupled fixedly to the rotary dial, such that the electronic touch sensor rotates with the rotary dial.

4. The peripheral user-interface device of claim 1 further comprising logic configured to transform the coordinates of user touch based on an orientation of the electronic touch sensor relative to the electronic display.

5. The peripheral user-interface device of claim 4 wherein the logic is configured to transform the coordinates of user touch based on output of the peripheral orientation sensor.

6. The peripheral user-interface device of claim 4 wherein the electronic display includes a host orientation sensor, and wherein the logic is configured to transform the coordinates of user touch based on comparative output of the host and peripheral orientation sensors.

7. A peripheral user-interface device for a computer system, the peripheral user-interface device comprising:
   a base movable relative to an electronic display;
   a rotary dial arranged on the base and rotatable relative to the base;
   an electronic touch sensor coupled mechanically to the base;
   a display-sensing orientation sensor configured to sense optical or acoustic radiation from the electronic display; and
   an output interface configured to output, to the computer system, data representing an extent of rotation of the rotary dial and coordinates of user touch on the electronic touch sensor.

8. The peripheral user-interface device of claim 7 wherein the optical or acoustic radiation received from the electronic display is emitted by the electronic display during a calibration timeslice.

9. The peripheral user-interface device of claim 7 wherein the optical or acoustic radiation sensed from the electronic display is a reflected optical or acoustic radiation originating from the peripheral user-interface device.

10. The peripheral user-interface device of claim 7 wherein the display-sensing orientation sensor includes an imaging sensor cooperating with an object-recognition module.

11. The peripheral user-interface device of claim 7 wherein the display-sensing orientation sensor includes a time-of-flight sensor.

12. A peripheral user-interface device for a computer system, the computer system including an electronic display, the peripheral user-interface device comprising:
   a base movable relative to the electronic display;
   a rotary dial arranged on the base and rotatable relative to the base;
   an electronic touch sensor coupled mechanically to the base;
   a peripheral orientation sensor; and
   an output interface configured to output to the computer system: data representing an extent of rotation of the rotary dial, data representing coordinates of user touch on the electronic touch sensor, and data representing an orientation of the peripheral user-interface device, wherein the data representing the orientation of the peripheral user-interface device is usable in the computer system to map the coordinates of user touch onto a frame of reference of the electronic display.

13. The peripheral user-interface device of claim 12 wherein the peripheral orientation sensor is a display-sensing orientation sensor configured to sense optical or acoustic radiation from the electronic display.

14. The peripheral user-interface device of claim 12 wherein the peripheral orientation sensor is configured to sense an absolute orientation of the electronic touch sensor.

15. The peripheral user-interface device of claim 12 wherein the peripheral orientation sensor includes an electronic compass and an inclinometer.

16. The peripheral user-interface device of claim 12 further comprising a host orientation sensor, wherein the data representing the orientation of the peripheral user-interface device is usable in conjunction with output of the host orientation sensor to map the coordinates of user touch onto the frame of reference of the electronic display.

* * * * *